United States Patent Office 3,491,146
Patented Jan. 20, 1970

3,491,146
(ARYLTHIOUREIDOALKYL)TRI-ALKYL-
AMMONIUM HALIDES
John H. Cornell, Jr., Arlington, Mass., and Philip C.
Hamm, Glendale, Mo., assignors to Monsanto Research
Corporation, St. Louis, Mo., a corporation of Delaware
No Drawing. Filed Oct. 29, 1965, Ser. No. 505,743
Int. Cl. C07c 157/06
U.S. Cl. 260—552    6 Claims

ABSTRACT OF THE DISCLOSURE

Novel (arylthioureidoalkyl)tri-alkylammonium halides of the formula

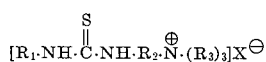

where $R_1$ is a naphthyl radical, a lower alkyl substituted naphthyl radical, a phenyl radical or a lower alkyl substituted phenyl radical, $R_2$ is a lower alkylene radical of from 1 to 6 C atoms, each $R_3$ is a lower alkyl radical of from 1 to 6 C atoms, and X is a halogen atom of atomic weight below 130. These compounds are biological toxicants and may be used as fungicides, herbicides and defoliants.

---

This invention relates to the reaction of (ω-aminoalkyl)-trialkylammonium halides with aryl isothiocyanates and to the products thereof.

It is an object of this invention to provide new (arylthioureidoalkyl) trialkylammonium halides, of the formula

wherein $R_1$ is an aromatic hydrocarbon radical of up to 12 C atoms, $R_2$ is a saturated aliphatic hydrocarbon radical containing from 1 to 6 carbon atoms, each $R_3$ is an alkyl radical of from 1 to 6 carbon atoms, and X is a halogen atom having an atomic weight below 130.

It is another object of the invention to provide new compounds useful as biological toxicants.

Still another object of this invention is to provide new compounds useful as fungicides.

These and other objects will become apparent from a consideration of the following specification and claims.

There are shown below a number of the specific new compounds of the invention. It is not intended that this be a complete listing of all the compounds of the invention, but that it merely be illustrative thereof:

[1-(3-biphenylthioureido)methyl]dipentylhexyl-
 ammonium iodide
[1-(3-phenylthioureido)methyl]dimethylethyl-
 ammonium fluoride
[2-[-(2-ethylnaphthyl)thioureido]ethyl]dibutylhexyl-
 ammonium bromide
[2-[3-(2,4-diethylbenzyl)thioureido]ethyl]triethyl-
 ammonium iodide
[2-[3-(2-methyl-3-propylbenzyl)thioureido]ethyl]-
 diethylpentyl-ammonium chloride
[3-(3-benzylthioureido)propyl]trimethylammonium
 bromide
[3-(3-xylylthioureido)propyl]tributylammonium fluoride
[4-[3-(2-ethylbenzyl)thioureido]butyl]dimethylethyl
 ammonium chloride
[5-(3-tolylthioureido)pentyl]tripentylammonium
 bromide
[4-(3-naphthylthioureido)butyl]dipropylmethyl-
 ammonium chloride
[4-(3-phenylthioureido)butyl]dipentylmethyl-
 ammonium iodide
[2-(3-phenylthioureido)ethyl]triethylammonium
 iodide
[5-(3-naphthylthioureido)pentyl]trimethylammonium
 chloride
[3-(3-tolylthioureido)propyl]diethylbutylammonium
 bromide
[6-[3-(2-ethylbenzyl)thioureido]hexyl]dibutylmethyl
 fluoride
[1-(3-xylylthioureido)methyl]trimethylammonium
 iodide
[5-(3-benzylthioureido)pentyldipropylethylammonium
 chloride
[4-[3-(2-methyl-3-propylbenzyl)thioureido]butyl]-
 tributyl-ammonium bromide
[6-[3-(2,4-diethylbenzyl)thioureido]hexyl]trihexyl-
 ammonium bromide
[3-[3-(2-ethylnaphthyl)thioureido]propyl]diethyl-
 methylammonium fluoride
[2-[3-(1,3-dimethyl-5-ethylphenyl)thioureido]ethyl]
 diethylmethylammonium fluoride and so forth.

Preparation of the presently provided novel compounds is effected by reaction of a (ω-aminoalkyl)trialkylammonium halide with an aryl isothiocyanate, as illustrated by the equation:

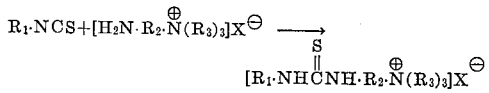

where $R_1$, $R_2$, $R_3$ and X are as defined above.

In preparing the compounds of this invention, (ω-aminoalkyl)trialkylammonium halides which may be used are, for example, (aminomethyl)dipentylhexylammonium iodide
(aminomethyl)dimethylethylammonium fluoride
(2-aminoethyl)dibutylhexylammonium bromide
(2-aminoethyl)triethylammonium iodide
(2-aminoethyl)diethylpentylammonium chloride
(3-aminopropyl)trimethylammonium bromide
(3-aminopropyl)tributylammonium fluoride
(4-aminobutyl)dimethylethylammonium chloride
(5-aminopentyl)tripentylammonium bromide
(4-aminobutyl)dipropylmethylammonium chloride
(4-aminobutyl)dipentylmethylammonium iodide
(3-aminopropyl)diethylbutylammonium bromide
(5-aminopentyl) trimethylammonium chloride
(aminomethyl)trimethylammonium iodide
(6-aminohexyl)dibutylmethylammonium fluoride
(4-aminobutyl)tributylammonium bromide
(5-aminopentyl)dipropylethylammonium chloride
(3-aminopropyl)dimethylpropylammonium chloride
(6-aminohexyl)trihexylammonium bromide
(2-aminoethyl)diethylmethylammonium fluoride, and so forth.

Useful isothiocyanates are, for example:

phenyl isothiocyanate
2,4-diethylbenzyl isothiocyanate
benzyl isothiocyanate
2-ethylbenzyl isothiocyanate
naphthyl isothiocyanate
tolyl isothiocyanate
xylyl isothiocyanate 2-methyl-3-propylbenzyl isothiocyanate
2-ethylnaphthyl isothiocyanate
5-ethyl-2,3-dimethylphenyl isothiocyanate
biphenyl isothiocyanate, and so forth.

In carrying out the process of this invention, the selected ammonium halide compound is simply contacted with the aryl isothiocyanate until reaction is complete. Some of the presently useful (aminoalkyl) trialkyl-ammonium halides are most conveniently available as the hydrohalide salts, rather than as the free base, because of inconvenient properties of the free base such as hygroscopicity or the like. In this case, the free base can be released from the hydrohalide salt by mixture in aqueous solution with an alkali such as KOH, NaOH or the like, and the resulting mixture of the alkali metal halide and the (aminoalkyl) trialkyl-ammonium halide contacted with the aryl isothiocyanate to produce the desired product. The reaction mixture may also, if desired, contain solvents or diluents, to moderate the reaction, facilitate stirring and so forth, such as acetonitrile, propionitrile, butyronitrile and the like.

Since the reaction takes place by condensation of one mole of the ammonium halide with one mole of the aryl isothiocyanate, advantageously a 1:1 ratio of reactants is employed. The ratio of reactants is not important, however, and if desired, molar ratios of the ammonium halide to aryl ester of from about 1:10 to about 10:1 may be used. Excess reactant can then be removed at the end of the reaction by, for example, extraction or distillation.

Useful temperatures for conducting the preparation are, for example, the reflux temperature of the reaction mixture, or any desired temperature from below 0° C. up to below the decomposition point of the ingredients of the reaction mixture. Atmospheric pressure is satisfactory for conducting the reaction, though sub- or superatmospheric pressures may be used if desired, ranging from 0.05 mm. Hg of mercury to about 5000 pounds per square inch. No catalyst is needed. Time may vary; in general, it will depend on the nature of the reactants used and on the temperature of the reaction. Ordinarily reaction times will vary from less than one minute to several hours.

The isolation of the product may be accomplished by general standard procedures, such as distillation, extraction, or crystallization, for example.

The present (arylthioureidoalkyl)trialkylammonium halides are generally stable, well-defined products, which are soluble in organic solvents such as nitriles, such as acetonitrile, propionitrile, butyronitrile and valeronitrile, and alcohols, such as methanol, ethanol and propanol, for example.

The (arylthioureidoalkyl)trialkylammonium halides of this invention are useful for a variety of agricultural and industrial applications; for example, they are generally biological toxicants, and may be used as fungicides, herbicides, and defoliants. The iodides are especially preferred as biological toxicants, particularly as defoliants.

The invention will be further described with reference to the following specific examples. These examples are given for purposes of illustration only and are not to be taken as in any way restricting the invention.

EXAMPLE 1

This example illustrates the preparation of compounds in accordance with this invention.

Free (2-amino-ethyl)triethylammonium iodide is obtained from it HI salt by adding sufficient 10% aqueous KOH to an aqueous solution of 9.1 grams (g.) (0.0227 mole) of (2-aminoethyl)triethylammonium iodide hydroiodide to adjust the pH to 10.1. The resulting solution is evaporated to dryness under reduced pressure, and the residue obtained is further dried at reduced pressure (0.1 mm. Hg) for 16 hours. The residue, a mixture of (2-aminoethyl)triethylammonium iodide and KI, is hygroscopic and is kept free from atmospheric moisture.

To a reaction flask containing the stated residue slurried in 25 milliliters (ml.) of acetonitrile is added 3.06 g. (0.0227 mole) of phenyl isothiocyanate. The reaction mixture is refluxed for 20 minutes, cooled to ambient temperature, and filtered. The potassium iodide precipitate thus removed is discarded, and the filtrate is evaporated to dryness under reduced pressure. The residue is triturated several times with petroleum ether and diethyl ether to give a tan solid, which is crude [2-(3-phenylthioureido)ethyl]triethylammonium iodide, contaminated with KI.

The tan solid is dissolved in dichloromethane and filtered to remove undissolved potassium iodide. The filtrate is extracted several times with water, dried, and evaporated to give a product which, after recrystallization from absolute ethanol, is a white crystalline solid, which is pure [2-(3-phenylthioureido)ethyl]triethylammonium iodide, M. 114–116° C. (with effervescence).

Elemental analysis of this product confirms the assigned structure, $C_{15}H_{26}IN_3S$.

| Element | Percent Calculated | Percent Found |
| --- | --- | --- |
| C | 44.3 | 44.1 |
| H | 6.4 | 6.3 |
| I | 31.2 | 31.6 |
| N | 10.3 | 10.2 |

EXAMPLE 2

This example illustrates the use of a compound of the present invention as a soil fungicide.

A container holding 30 g. of a mixture consisting of sterile sand blended with a cornmeal-sand culture of *Rhizoctonia solani,* a fungus causative of seedling blight, is drenched with 4 ml. of a solution of the phenyl compound of Example 1, at a concentration of 231 p.p.m. The final concentration based on soil weight is 30 p.p.m.

A container of soil which has not been drenched by the solution containing the phenyl compound and the container which has been drenched are then put into pans and placed into an incubation chamber (90% to 100% relative humidity) for 48 hours. At the end of the test period a heavy growth of the fungus is observed on the soil in the undrenched container, while only slight growth, limited to the individual cornmeal-sand particles, is observed in the container drenched with the phenyl compound.

By contrast, similar administration of [2-(3-cyclohexylthioureido)ethyl]triethylammonium iodide produces no inhibition of fungus growth, and a growth equal to that in the untreated container is observed.

The stated cyclohexyl compound is prepared in a similar manner to the phenyl compound, as described in Example 1. An aqueous solution of 52 g. of (2-aminoethyl)triethylammonium iodide hydroiodide is adjusted to pH 10.1 with KOH, the resulting solution is evaporated to dryness under reduced pressure, and the residue is further dried at reduced pressure. The dried residue, slurried in 25 ml. of acetonitrile, is mixed with 17.5 g. of cyclohexyl isothiocyanate, and the mixture is refluxed, cooled and filtered. The filtrate is evaporated to dryness under reduced pressure and the residue triturated with petroleum ether and diethyl ether to give a solid which is dissolved in dichloromethane. The solution is filtered and the filtrate is extracted with water, dried, and evaporated to give a product which is recrystallized from ethanol to give [2 - (3-cylohexylthioureido)ethyl]triethylammonium iodide, yellow crystals, M. 136–142° C.

EXAMPLE 3

This example illustrates the use of a compound of the present invention as a defoliant.

To test defoliant activity, Black Valentine bean plants, 4 to a pot, are grown to the stage of having one mature trifoliate and one partially opened trifoliate, and then sprayed with [2-(3-phenylthioureido)ethyl]triethylammonium iodide as an aqueous emulsion, at rates of 0.1 and 1.0 pound per acre, using a dilution of 30 gallons/acre, after which plants are kept in a greenhouse at 70–90° F. At the end of 14 days, 100% defoliation is observed for plants sprayed at the higher rate, and over 50% defoliation for the plants sprayed at the lower rate. [2-(3-phenylthioureido)ethyl]triethylammonium iodide also defoliates soybean, on application to soy plants at a rate of 10 pounds/acre.

The present (arylthioureidoalkyl)trialkyl ammonium halides may be applied for toxicant use in the forms of sprays, aerosols, dusts or the like. Useful sprays may be prepared by dispersing the present products in water with the aid of a wetting agent, to prepare aqueous dispersions which may be employed as sprays.

For example, a solution of cyclohexanone and a polyalkylene glycol ether long chain alkyl benzene sulfonate emulsifier may be used to prepare such dispersions or emulsions. The products may also be applied to plants or soils as oil-in-water emulsion sprays. The present products may also be dissolved or dispersed in liquefied gases such as fluorochloroethanes or methyl chloride and applied to plants or soil from aerosol bombs. Toxicant dusts containing the present novel arylthioureido compounds as active ingredients may be prepared, for example, by incorporating the new products of this invention with a solid carrier such as talc, bentonite, fuller's earth, and so forth.

The amount of active toxicant compounds in the composition as applied will vary with the active ingredients, the manner of application, the species to be destroyed and the resistance of the organism to be sprayed, for example, and formulation and ratio of applications are suitably adjusted in accordance with these factors.

While the invention has been describe with particular reference to specific embodiments thereof, it will be appreciated that modifications and variations can be made without departing from the scope of the invention, which is limited only as defined in the appended claims.

What is claimed is:

1. A (arylthioureidoalkyl)tri-alkylammonium halide of the formula

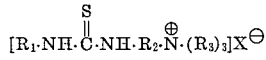

where $R_1$ is chosen from the group consisting of the naphthyl radical, a lower alkyl substituted naphthyl radical, the phenyl radical and a lower alkyl substituted phenyl radical, $R_2$ is a lower alkylene radical of from 1 to 6 C atoms, each $R_3$ is a lower alkyl radical of from 1 to 6 C atoms and X is a halogen atom of atomic weight below 130.

2. A compound of claim 1 in which $R_1$ is the phenyl radical.

3. A compound of claim 2 in which $R_2$ is the ethylene radical.

4. A compound of claim 3 in which $R_2$ is the ethyl radical.

5. A compound of claim 1 in which X is an iodine atom.

6. [2 - (3 - phenylthioureido)ethyl]triethylammonium iodide.

References Cited

UNITED STATES PATENTS

| | | | |
|---|---|---|---|
| 3,061,640 | 10/1962 | Beaver et al. | 260—552 |
| 3,065,110 | 11/1962 | Hagge et al. | 260—553 |
| 2,967,101 | 1/1961 | Hamm et al. | 260—552 |
| 2,911,393 | 11/1959 | Brooks et al. | 260—552 |

LEON ZITVER, Primary Examiner

M. W. GLYNN, Assistant Examiner

U.S. Cl. X.R.

71—72, 99; 260—999; 424—322